United States Patent [19]
Matsuo et al.

[11] Patent Number: 4,905,436
[45] Date of Patent: Mar. 6, 1990

[54] COLUMN/BEAM JOINT STRUCTURE

[75] Inventors: Hideshige Matsuo; Isamu Yamamato; Michio Itoh, all of Kitakyushu; Shue Suzuki, Machida; Mitsunobu Iwata, Kitakyushu; Kuniaki Sato, Hirastuka; Yukihiro Omika, Tokyo; Yoshihiro Nakamura, Tama; Akio Tomita, Tokyo; Toshikazu Yamada, Akishima; Toshio Saeki, Tama; Kouichi Suguki, Shiki, all of Japan

[73] Assignee: Hitachi Metals, Ltd., Tokyo, Japan

[21] Appl. No.: 267,504

[22] Filed: Nov. 4, 1988

[30] Foreign Application Priority Data

Mar. 28, 1988 [JP] Japan .................................. 63-73519
May 31, 1988 [JP] Japan ................................. 63-133950

[51] Int. Cl.⁴ ............................................... E04B 1/40
[52] U.S. Cl. ........................................ 52/252; 52/483;
52/721; 403/189; 403/174
[58] Field of Search ................. 52/250, 252, 280, 282,
52/278, 721, 483; 403/170, 172, 173, 174, 175,
176, 187, 189, 191, 192, 262, 199

[56] References Cited
U.S. PATENT DOCUMENTS

| 1,801,474 | 4/1931 | Williams | 403/189 X |
| 1,939,732 | 12/1933 | Stresau | 52/483 |
| 1,982,343 | 11/1934 | Kane | 52/252 |
| 2,439,129 | 4/1948 | Donahue et al. | 52/721 |
| 2,619,687 | 12/1952 | Kahn | 403/262 X |
| 4,054,392 | 10/1977 | Oppenheim | 403/174 |
| 4,095,912 | 6/1978 | Hagberg | 403/187 |
| 4,220,419 | 9/1980 | Hawes | 403/189 |
| 4,577,449 | 3/1986 | Celli | 52/721 |

FOREIGN PATENT DOCUMENTS 495031  5/1977  Australia ............................. 52/721

OTHER PUBLICATIONS

Manual of Steel Construction, Eighth Edition, American Institute of Steel Construction, Inc., ©1980, pp. 4–121 Thru 4–124.

Primary Examiner—Richard E. Chilcot, Jr.
Attorney, Agent, or Firm—McGlew & Tuttle

[57] ABSTRACT

A column/beam joint structure, made of steel members, in which a reinforcing member formed into a flat plate or into a strip shape so as to surround the outer periphery of the flange is interposed between a flange having a vertical plane constituting the column and a base plate constituting a connector fixedly fitted to an end of a beam. The flange, the reinforcing member and the connector are integrally joined together via a connecting fastener member.

7 Claims, 8 Drawing Sheets

COLUMN/BEAM JOINT STRUCTURE

BACKGROUND OF THE INVENTION

This invention relates to a column/beam joint structure for use in a steel frame construction, or a combination construction of steel-frame and reinforced concrete constructions, or a combination construction of steel-frame and steel-frame reinforced-concrete constructions.

DESCRIPTION OF PRIOR ART

Conventional methods of joining a column and a beam include a method of directly joining a column and a beam in-situ welding, a method of joining both via brackets with high-tension bolts and so on. The former method involves welding members while assembling steel frames at the outdoor work site, resulting in dimensional errors due to welding strains, or defects in welds due to an improper gas seal or moisture entry under bad weather conditions. In other words, the former method has a difficulty in quality control, especially on welded joints between columns and beams. The latter method, on the other hand, requires considerable manhours in fabricating and welding a bracket to a column, and fabricating a connecting plate and drilling holes on it for joining the bracket and the beam with bolts.

As an improvement to overcome the abovementioned drawbacks, Japanese Patent Publication No. 38734/1982 has been disclosed, which concerns a column/beam joint structure for joining a column 1 and a beam 2 via a connector 3, as shown in FIG. 1. The connector 3 consists of a base plate 21 and a projection 32 having a T-shaped cross-section, each designed to be directly welded to the flange 2a and web 2b of the beam 2. And the base plate 31 of the connector 3 is joined to the flange 1a of the column 1 via connecting bolts 4.

The abovementioned column/base joint structure has the following problems.

(1) A plurality of through holes (not shown) have to be drilled on the flange 1a of the column 1 to fasten the connector 3 with connecting bolts 4. This could reduce the cross-sectional area of the flange 1a at the joint portion, resulting in deteriorated performance of the column 1.

(2) If a bending moment M is exerted on the joint portion, as shown in FIG. 1, a tensile force T and a compressive force C are exerted on the connector 3, causing the column flange 1a to be locally deformed, with the outside surface thereof becoming concave, as shown in FIG. 2. Consequently, this structure cannot ensure sufficient rigidity for the joint portion.

(3) As shown in FIG. 1, a reinforcing stiffener 6 may be fastened to the column 1 at a location corresponding to the connector 3. Though having a certain effect to improve the rigidity of the column 1, this arrangement involves additional manhours to fabricate and fasten the stiffener 6, and is not necessarily effective in preventing the flange 1a from deforming.

Another example of the joint structure for joining a column and a beam, both of a relatively large size is shown in FIGS. 3 and 4. FIG. 3 is a partially cross-sectional front view of the joint structure, and FIG. 4 a partially cross-sectional plan view of the same. In FIGS. 3 and 4, the column 1 is constructed by assembling H-steel beams in a criss-cross fashion into a single unit, and a connector 3 is welded to an end of the beam 2 consisting of a H-steel beam and then fastened to the flange 1a of the column 1 with connecting bolts 4 and nuts 5. Numeral 6 refers to a stiffener, which is provided in the column 1 at a location corresponding to the flange 2a of the beam 2.

In the column/beam joint structure having the above-mentioned arrangement, the joint portion of the connector 3 and the beam 2 has sufficient strength and rigidity since the flange 2a of the beam 2 is joined to the connector 2 by butt welding over the entire cross-section. The flange 1a of the column 1 tends to have insufficient outwardly bending strength and rigidity to resist the tensile force transmitted from the flange 2a of the beam 2 because the connector 3 and the column 1 are joined together with connecting bolts 4 and nuts 5. In an earthquake or rainstorm, for example, the flange 1a of the column 1 might locally deform toward the outside of the column surface. To ensure the outwardly bending strength and rigidity of the flange 1a of the column 1, a method may be employed of fastening a cover plate (not shown) on the inside of the flange 1a. If the web 1b of the column 1 is thin, however, this arrangement requires the provision of a stiffener or a reinforcing rib (not shown) to prevent fracture at the web 1b. Addition of the cover plate or any other reinforcing member would inevitably increase the weight of the column 1, leading to increased manhours and therefore deteriorated economy. Moreover, the column/beam joint structure of the above-mentioned construction requires bolt holes to be provided on the flange 1a of the column 1 to connect the conector 3 and the column 1, resulting in reduced cross-sectional area of the column 1 at the joint portion. This could impair the strength of the column 1 at the joint portion, leading to lowered earthquake resistance of the building.

SUMMARY OF THE INVENTION

It is the first object of this invention to provide a column/beam joint structure having high strength and rigidity by compensating the loss of the cross-sectional area of the column flange due to provision of through holes for connecting bolts.

It is the second object of this invention to prevent the local deformation of the column flange caused by a bending moment acting on the joint portion.

It is the third object of this invention to provide a column/beam joint structure that can be realized by relatively simple and safe operations.

DETAILED DESCRIPTION OF THE EMBODIMENTS

Figure 1:
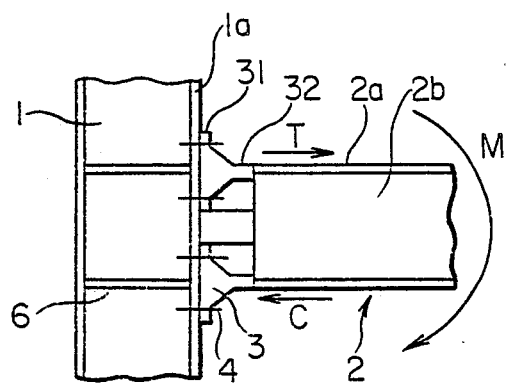
FIG. 1 is a front view of the essential parts of an example of conventional column/beam joint structures.
Figure 2:
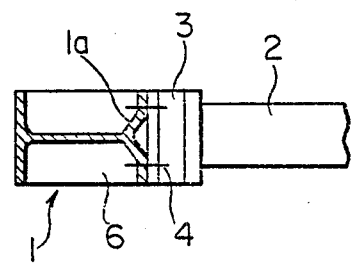
FIG. 2 is a partially cross-sectional plan view illustrating the state of deformation of the column flange in FIG. 1.
Figure 5:
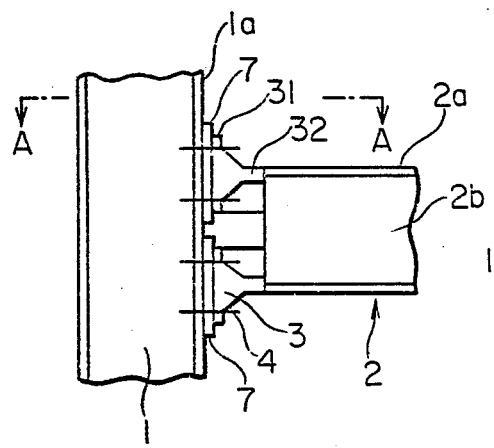
FIG. 5 is a front view of the essential part of a first embodiment of this invention.
Figure 6:
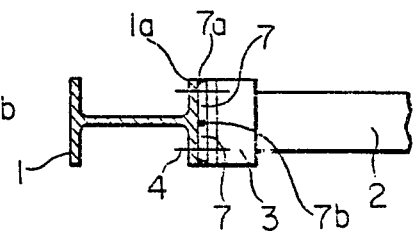
FIG. 6 is a cross-sectional view taken along line A—A in FIG. 5.
Figure 3:
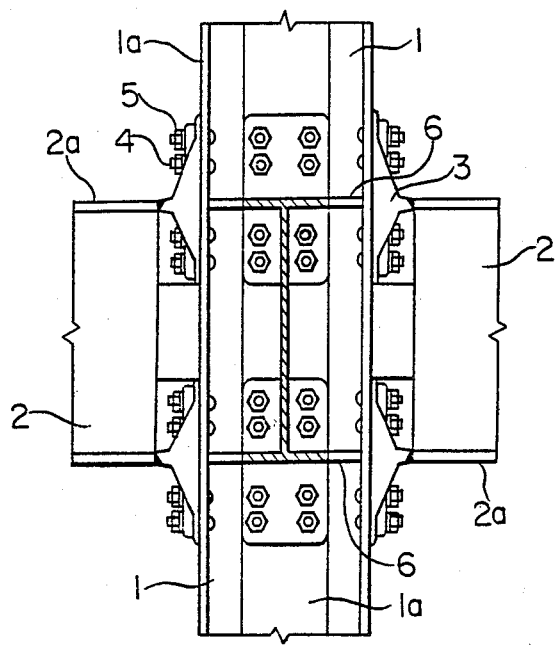
FIG. 3 is a partially cross-sectional front view illustrating another example of conventional column/beam structures.
Figure 4:
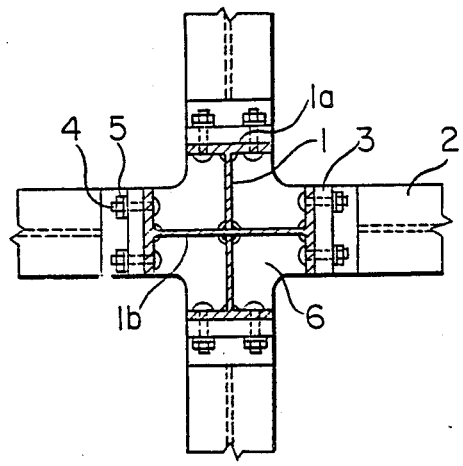
FIG. 4 is a partially cross-sectional plan view of the example shown in FIG. 3.

FIG. 5 is a front view of the essential part of a first embodiment of this invention, and FIG. 6 is a cross-sectional view taken along line A—A in FIG. 5. Like parts are indicated by like numerals used in FIGS. 1 and 2 above. In both figures, numeral 7 refers to a reinforcing plate, made of a steel material similar to the column 1, the beam 2 and the connector 3, which is formed into a rectangular flat shape, and a split portion 7b is provided between the reinforcing plates in the axial direction of the column 1 at the central part of the flange 1a; the reinforcing plates 7 being welded at the split portion 7b to the surface of the flange 1a opposing to the base plate 31 constituting the connector 3. In welding the reinforcing plates 7 at the split portion 7b to the surface of the flange 1a, a groove 7a should preferably be provided at the outside edge of the reinforcing plate 7. The width of the split portion 7b between the opposing reinforcing plates 7 should preferably be so narrow that the inside edges of the reinforcing plates 7 and the flange 1a can be welded together. According to the preferred form of the invention, the re-inforcement plates are provided as two flat plates. The split portion 7b of the flat plate is welded to the column flange by forming a square groove with a gap provided. The outside edges of the flat plate are welded to the column flange by forming single bevel grooves, or a single jay groove, at the outside edges of the flat plate, as shown in FIG. 6. The outside edges of the flat plate may be fillet-welded to the column flange. In addition, the throat thickness (thickness of weld metal) to fill the split portion 7b should preferably be as thick as possible but not thicker than the thickness of the reinforcing plate 7. The upper and lower ends of the reinforcing plate 7 in the axial direction of the column 1 are usually welded to the flange 1a of the column 1, but the welding of them may be omitted to reduce manhours so long as sufficient strength can be guaranteed. Before or after the reinforcing plate 7 is welded to the column flange 1a, through holes (not shown) corresponding to the through holes (not shown) provided on the connector 3 are drilled on the reinforcing plate 7.

Figure 7:
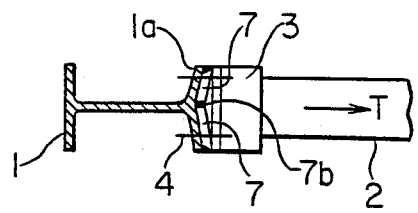
FIG. 7 is a partially cross-sectional plan view illustrating the state of deformation of the column flange in the first embodiment of this invention.

With the above arrangement, the column 1 and the beam 2 can be joined together by holding in position the beam 2 having the connector 3 fastened to one end thereof, and fastening the connector 3 to the flange 1a with connecting bolts 4. If a tensile force T is exerted on the beam 2 as a bending moment acts on a joint structure joined in the abovementioned manner, as shown in FIG. 7, a slight deformation is generated in the flange 1a. The deformation, however, is limited to an extremely small range because the reinforcing plate 7 is divided by the split portion 7b in the axial direction of the column 1, and welded together with the flange 1a.

Figure 8:
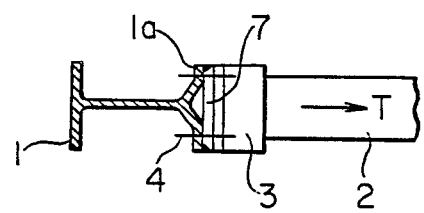
FIG. 8 is a partially cross-sectional plan view illustrating the state of deformation of the column flange in the first embodiment.

FIG. 8 is a partially cross-sectional plan view illustrating the state of deformation of the column flange, which corresponds to FIG. 7. In the figure, the reinforcing plate 7 is formed in the substantially same width as the width of the flange 1a, and the outside edges of the reinforcing plate 7 are welded to the flange 1a, as in the case of FIG. 7. The reinforcing plate 7 in FIG. 8, however, is formed into an undivided monolithic plate having no split portion. Consequently, if a tensile force T is exerted on the beam 2, as in the above example, a slight gap is produced between the flange 1a and the reinforcing plate 7. This results in a weaker effect to prevent the local deformation of the flange 1a.

Figure 9:
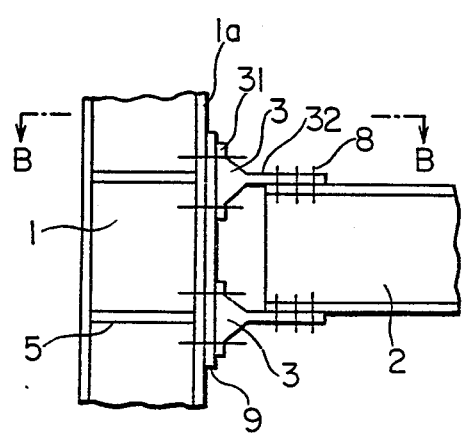
FIG. 9 is a front view of the essential part of a second embodiment of this invention.
Figure 10:
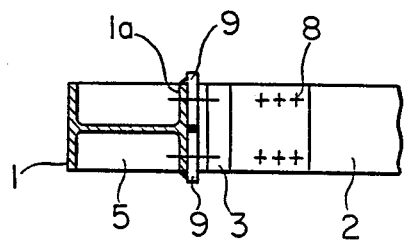
FIG. 10 is a cross-sectional view taken along line B—B in FIG. 9.

FIG. 9 is a front view of the essential part of a second embodiment of this invention, and FIG. 10 is a cross-sectional view taken along line B—B in FIG. 9. Like parts are indicated by like numerals used in the description of the first embodiment. In both figures, the projection 32 of the connector 3 has a plurality of through holes (not shown) for connecting to the beam 2. The construction of this embodiment is essentially the same as that of the first embodiment shown in FIGS. 5 and 6, except that a reinforcig plate 9 is formed in such a manner that the length thereof extends to the upper and lower connectors 3 and 3; with the horizontal side edges thereof being projected slightly from the edges of the flange 1a. The effects of the reinforcing plate 9 is the same as in the first embodiment. Forming the reinforcing plate 9 in such a manner as to protrude from the edges of the flange 1a has an advantage in that the outside edges of the reinforcing plate 9 can be welded directly to the flange 1a without groove preparation.

Figure 11:
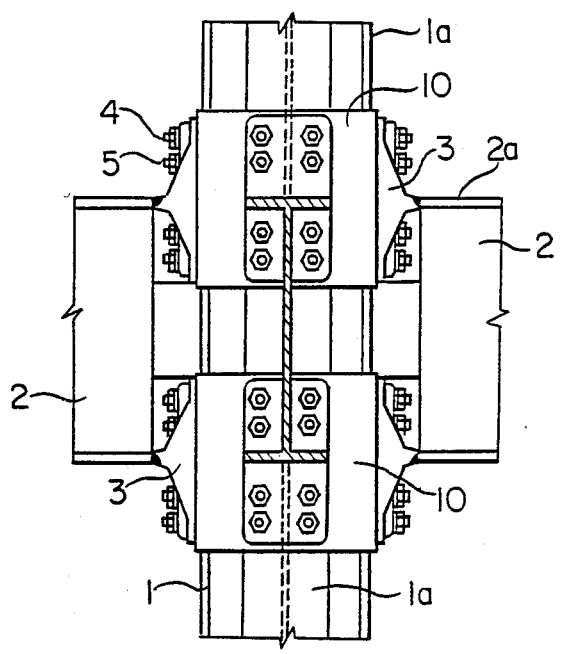
FIG. 11 is a partially cross-sectional front view of a third embodiment of this invention.
Figure 12:
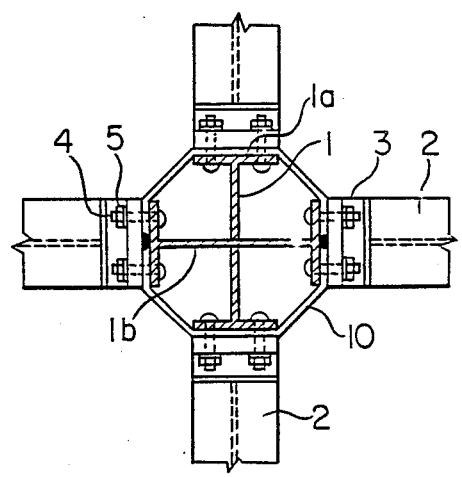
FIG. 12 is a partially cross-sectional plan view of the third embodiment of this invention.

FIGS. 11 and 12 are a partially cross-sectional front view and a partially cross-sectional plan view of a third embodiment of this invention. Like parts are indicated by like numerals in FIGS. 11 and 12. Numeral 10 refers to a strip member, made of steel plate and other structural material, formed in such a manner as to surround the outer periphery of the flange 1a of the column 1. The strip member 10 is interposed between the flange 1a and the connector 3 and fixedly fitted to the outer periphery of the flange 1a of the column 1 with the connecting bolts 4 and nuts 5.

With the abovementioned arrangement, a tensile force transmitted from the flange 2a of the beam 2 is distributed to a route consisting of the connector 3, the connecting bolts 4, the flange 1a of the column 1 and the web 1b of the column 1, and to a route consisting of the connector 3, the connecting bolts 4, the flange 1a of the column 1, the strip member 10 and another flange 1a of the column 1 (a flange 1a orthogonally intersecting the flange 1a mentioned earlier). Thus, fracture, deformation and other inconveniences caused by concentrated stresses on the web 1b of the column 1 can be successfully prevented.

Figure 13:
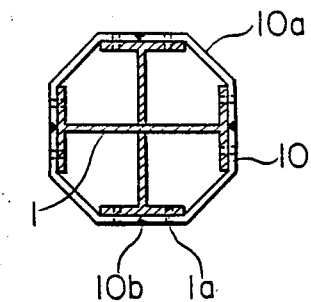
FIG. 13 is a partially cross-sectional plan view of a fourth embodiment of this invention.

FIG. 13 is a partially cross-sectional plan view of a fourth embodiment of this invention. In FIG. 13, numeral 10a refers to a split piece, made of steel plate or other structural material, formed into a virtually trapezoidal shape in a projected shape. The split piece 10a is butt welded to another adjoining split piece 10a at the central part of the flange 1a to form a strip member 10.

In this way, when the strip member 10 is divided into a plurality of split pieces 10a by providing split portions 10b in the axial direction of the column 1, and the split pieces 10b are assembled in such a manner as to surround the column 1, the fabrication of the strip member 10 and the installation thereof to the column 1 can be substantially facilitated.

Figure 14:
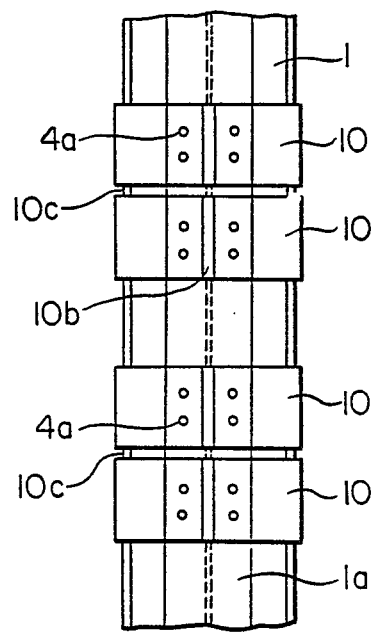
FIG. 14 is a front view of the essential part of a fifth embodiment of this invention.

FIG. 14 is a front view of the essential part of a fifth embodiment of this invention. FIG. 14 illustrate an example where a split portion 10c is provided in the direction normal to the axis of the column 1 to divide the strip portion 10 into a plurality of pieces. 4a denotes a bolt hole for passing the connecting bolt 4. 10b is a split piece assembled into a strip member 10, as in the case of the fourth embodiment. The effects expected when the split pieces 10b are assembled into the strip member 10 are the same as in the case of the fourth embodiment.

Figure 15:
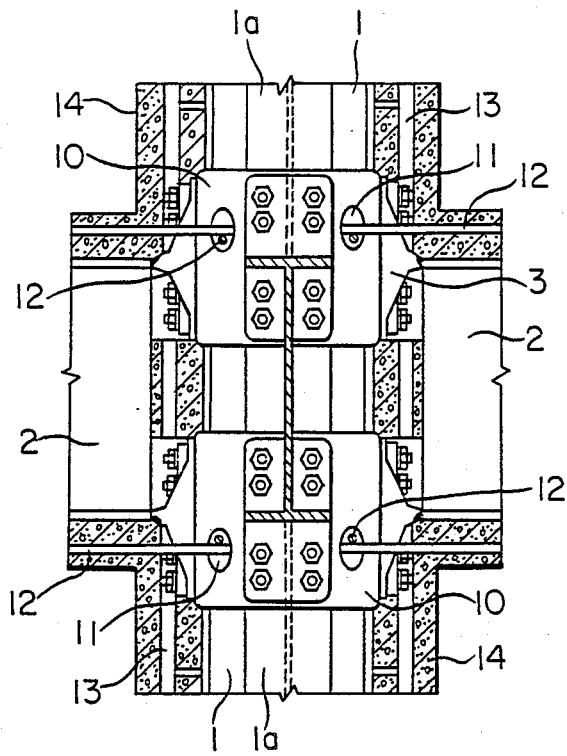
FIG. 15 is a partially cross-sectional front view of a sixth embodiment of this invention.
Figure 16:
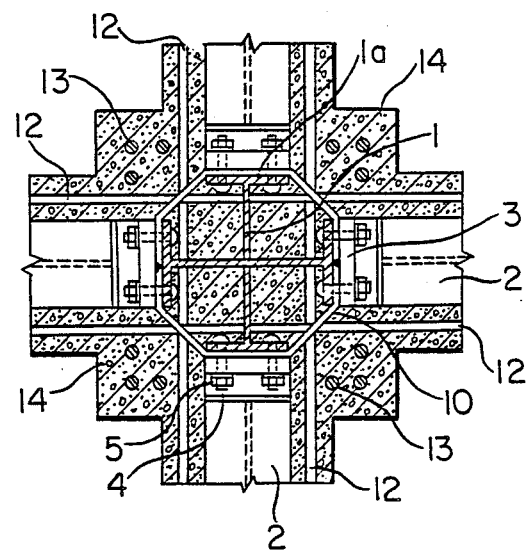
FIG. 16 is a partially cross-sectional plan view of the sixth embodiment of this invention.

FIGS. 15 and 16 are partially cross-sectional front view and a partially cross-sectional of a plan view of a sixth embodiment of this invention. Like parts in the figures are indicated by like numerals in the third through fifth embodiments. In FIGS. 15 and 16, numeral 11 refers to a through hole for passing through a main reinforcement 12, drilled on a portion of the strip member 10 at which the strip member 10 does not make contact with the flange 1a.

With this arrangement, concrete 14 can be cast into the inside of the column 1 and the outside of the column 1 and the beam 2. Thus, the joint structure of this invention using a strip member 10 having reinforcing and stress-distributing functions can be applied not only to steel-frame constructions as in the abovementioned embodiments, but also to combined steel-frame/reinforced concrete constructions.

Figure 17:
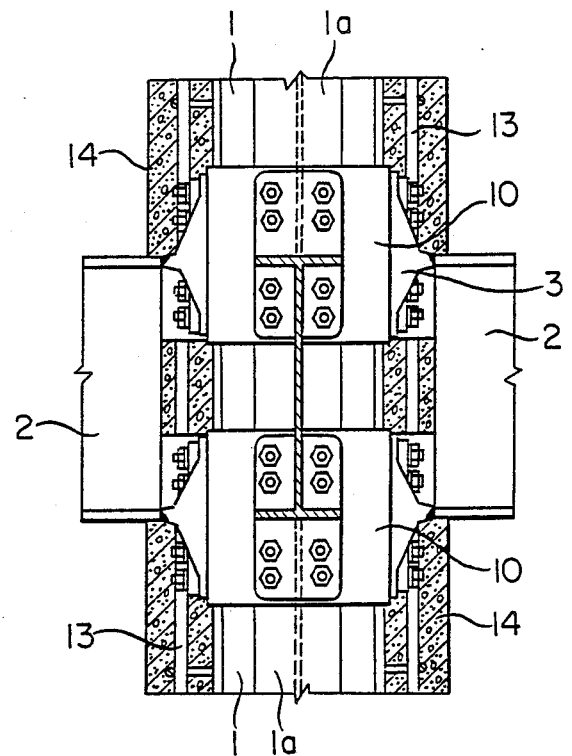
FIG. 17 is a partially cross-sectional front view of a seventh embodiment of this invention.
Figure 18:
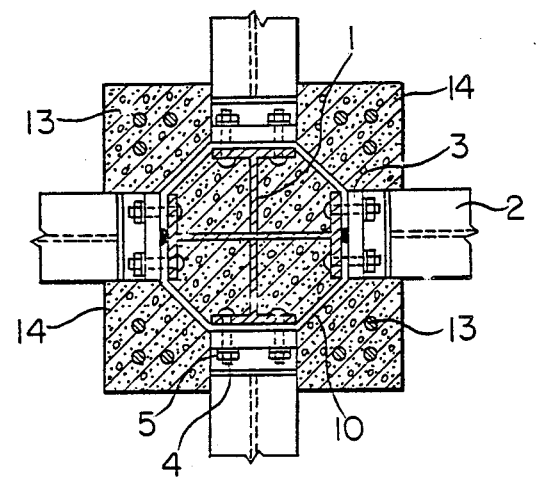
FIG. 18 is a partially cross-sectional plan view of the seventh embodiment of this invention.

FIGS. 17 and 18 are a partially cross-sectional front view and a partially cross-sectional plan view of a seventh embodiment of this invention, illustrating a combined steel-frame/steel-frame-reinforced concrete construction in which concrete 14 is placed in the inside and outside of the column 1, with the beam 2 used in the form of a steel frame. In this embodiment where no main reinforcement 12 as shown in FIGS. 15 and 16 is not used, the construction of the strip member 10 is the same as that shown in FIGS. 11 through 14, and therefore the same effects can be expected from the strip member 10.

Figure 19:
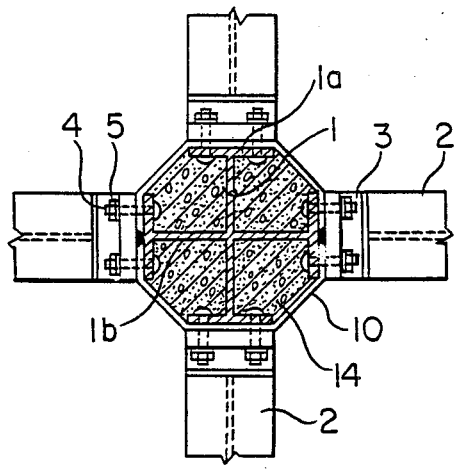
FIG. 19 is a partially cross-sectional plan view of an eighth embodiment of this invention.

FIG. 19 is a partially cross-sectional plan view of an eighth embodiment of this invention, in which concrete 14 is cast into the inside of the column 1 only.

With this arrangement, the strength and rigidity of the column 1 can be increased, as in the embodiments shown in FIGS. 15 through 18. That is, the concrete present inside the flange 1a can prevent the flange 1a from being deformed inward.

Figure 20:
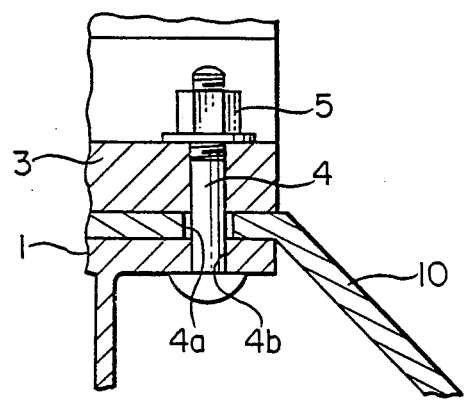
FIG. 20 is a partially enlarged cross-sectional view of a ninth embodiment of this invention.

FIG. 20 is a partially enlarged cross-sectional view of a ninth embodiment of this invention. In FIG. 20, numeral 4b refers to a bolt hole, drilled on the flange 1a for passing the connecting bolt 4. In this case, the connecting bolt 4 can be easily passed through the bolt hole 4a when the diameter of the bolt hole 4a provided on the strip member 10 is made larger than the diameter of the bolt hole 4a (the Enforcement Ordinance of the Building Standard Act stipulates that when the diameter d of a connecting bolt 4 is less than 20 mm, the diameter of the bolt hole should be d+1.0 mm, and when d is more than 20 mm, the inside diameter of the bolt hole should be d+1.5 mm). In other words, when the bolt holes 4a and 4b are drilled simultaneously after the strip member 10 is welded to the flange 1a, it is easy to align both the bolt holes 4a and 4b. When the bolt holes 4a and 4b are provided separately, it is troublesome to align the bolt holes 4a and 4b when installing the strip member 10 on the flange 1a. By making the diameter of the bolt hole 4a larger than that of the bolt hole 4b, therefore, the strip member 10 can be easily installed on the flange 1a.

In these embodiments described above, the column 1 is formed by a single H-steel beam or by assembling a plurality of H-steel beams in a criss-cross fashion. Needless to say, the same effects can be expected by using a column having a  shape formed by assembling a H-steel beam and an angle steel, or by joining steel plates by welding. The width, thickness and divisions of the reinforcing plate, the strip member or other reinforcing member can be selected appropriately by taking into account the shapes, dimensions of the column and the beam, the magnitude of external force, and man-hours. Furthermore, integrally joining the reinforcing member to the flange of the column by welding can prevent the deterioration of the performance (or the lowering of the strength) of the column from deteriorating due to the loss of the cross-sectional area resulting from bolt holes. The projected profile of the reinforcing member is not limited to an octagon, as shown in these embodiments, but other geometrical shapes can be used.

This invention having such constructions and operations as described above, can achieve the following beneficial effects.

(1) The loss of the cross-sectional area of the column flange due to through holes for connecting bolts can be compensated, the deterioration of the performance of the column/beam joint structure can be prevented and the performance, including earthquake resistance, of the building can be improved.

(2) The local deformation of the column flange caused by a bending moment acting on the joint can be prevented, and sufficient strength and rigidity for the joint can be ensured.

(3) Since the reinforcing member can be joined to the flange relatively easily without specially troublesome work or skills, work safety can be maintained during assembly.

(4) The casting performance of concrete in a steel-frame/reinforced-concrete column can be improved, leading to improved quality of the steel-frame/reinforced-concrete column.

What is claimed is:

1. A column and beam joint structure, comprising: a column member having a column flange; a beam member; a base plate including a projection part, said projection part being fixedly joined to said beam; reinforcing means including two flat plates for reinforcing said column, said two flat plates defining a split portion running along an axial direction of said column, said reinforcing means being welded to said column flange, said base plate being joined to said column flange by bolts with said flat plates interposed between said base plate and said column flange.

2. A column beam joint structure according to claim 1, wherein said reinforcing means split portion is welded to said column flange by forming a square groove providing a gap, said flat plates having outside edges which are welded to said column flange by one of forming a single bevel groove, forming single J grooves and forming fillet-welds at the outside edges of said flat plates.

3. A column beam joint structure according to claim 1, wherein said flat plates include outside edges which protrude from sides of ends of said column flange, said reinforcing means split portion being welded to said column flange by forming a square groove with a gap and fillet-welding outside-end portions of said flat plate to said column flange.

4. A column beam joint structure comprising: a column having a flange member; a beam; a base plate including a projection fixedly connected to said beam; reinforcing plate means including a strip-shaped reinforcing plate surrounding the outer periphery of said column flange; and, bolts joining said connector base plate and said column flange with said reinforcing plate interposed between said base plate and said column flange.

5. A column beam joint structure according to claim 4, wherein said strip-shaped reinforcing plate is split along an axial direction of said column, said split reinforcing plate being butt-welded to each other.

6. A column beam joint structure according to claim 5, wherein said strip-shaped reinforcing plate is separated in the axial direction of said column.

7. A column beam joint structure comprising:
a column member having a column flange defining a substantially flat connection surface;
a beam member;
a base plate including a projection part, said projection part being connected to said beam;
reinforcing means including first and second flat plates, each of said flat plates being welded to said substantially flat connection surface to define a gap between said flat plates, said flat plates and said gap defining a split portion running along an axial direction of said column, said base plate being joined to said column flange by bolts, said split portion being sandwiched between said base plate and said substantially flat flange disposed between said bolts.

* * * * *